United States Patent
Hildebrandt et al.

(10) Patent No.: US 9,204,405 B2
(45) Date of Patent: Dec. 1, 2015

(54) SYNCHRONIZATION METHODS AND APPARATUS

(71) Applicant: Itron, Inc., Liberty Lake, WA (US)

(72) Inventors: Holger Hildebrandt, Karlsruhe (DE); Keith W. Barnes, Waseca, MN (US); Bret Holmdahl, Greenacres, WA (US); Jim Ogle, Spokane, WA (US)

(73) Assignee: ITRON, INC., Liberty Lake, WA (US)

( * ) Notice: Subject to any disclaimer, the term of this patent is extended or adjusted under 35 U.S.C. 154(b) by 211 days.

(21) Appl. No.: 14/101,116

(22) Filed: Dec. 9, 2013

(65) Prior Publication Data

US 2015/0163756 A1 Jun. 11, 2015

(51) Int. Cl.
*H04W 56/00* (2009.01)
*G01D 4/00* (2006.01)
*H04J 3/06* (2006.01)
*H04Q 9/04* (2006.01)
*H04W 52/02* (2009.01)

(52) U.S. Cl.
CPC ............... *H04W 56/00* (2013.01); *G01D 4/00* (2013.01); *H04J 3/0602* (2013.01); *H04J 3/0635* (2013.01); *H04Q 9/04* (2013.01); *H04W 52/0229* (2013.01); *H04Q 2209/60* (2013.01); *H04Q 2209/845* (2013.01)

(58) Field of Classification Search
CPC ............ H04W 56/0015; H04W 52/029; H04J 3/0602; H04J 3/0635; H04Q 9/04; H04Q 2209/60; H04Q 2209/845
See application file for complete search history.

(56) References Cited

U.S. PATENT DOCUMENTS

| 5,883,886 | A | * | 3/1999 | Eaton | ................... G01D 4/004 340/7.21 |
|---|---|---|---|---|---|
| 7,061,924 | B1 | | 6/2006 | Durrant et al. | |
| 7,764,714 | B2 | | 7/2010 | Monier et al. | |
| 7,848,362 | B2 | | 12/2010 | Picard | |
| 8,248,268 | B2 | | 8/2012 | Cornwall et al. | |
| 8,269,649 | B2 | | 9/2012 | Cornwall | |

(Continued)

FOREIGN PATENT DOCUMENTS

| EP | 1037420 A2 | 9/2000 |
|---|---|---|
| EP | 2574113 A2 | 3/2013 |

(Continued)

OTHER PUBLICATIONS

Patent Cooperation Treaty, "International Search Report," issued in connection with Application No. PCT/US2014/068793, Mar. 18, 2015, 4 pages.

(Continued)

*Primary Examiner* — Paul H Masur
(74) *Attorney, Agent, or Firm* — Hanley, Flight & Zimmerman, LLC

(57) ABSTRACT

Synchronization methods, apparatus and systems are disclosed. An example method includes storing, in memory of a device, schedule information indicating times at which the device is to listen for a sequential series of data frames, the schedule information further indicating a reference time at which transmission of the sequential series of data frames to the device is to be initiated; initiating a listening session at a first time of the schedule information according to a native clock of the device; identifying which of the data frames of the sequential series is received first during the listening session; and adjusting the native clock of the device based on the identified data frame.

13 Claims, 13 Drawing Sheets

(56) References Cited

U.S. PATENT DOCUMENTS

| | | |
|---|---|---|
| 8,301,931 B2 | 10/2012 | Johnson |
| 8,436,744 B2 | 5/2013 | Cornwall et al. |
| 8,441,987 B2 | 5/2013 | Monier et al. |
| 8,462,015 B2 | 6/2013 | Picard |
| 8,531,311 B2 | 9/2013 | Cornwall et al. |
| 2002/0177460 A1 | 11/2002 | Beasley et al. |
| 2007/0238456 A1* | 10/2007 | Robins ............... G01D 4/002 455/422.1 |
| 2010/0026517 A1* | 2/2010 | Cumeralto ........... G01D 4/006 340/870.03 |
| 2010/0029230 A1 | 2/2010 | Linsky |
| 2010/0188259 A1 | 7/2010 | Johnson et al. |
| 2010/0188263 A1* | 7/2010 | Cornwall ............. G01D 4/006 340/870.03 |
| 2010/0188938 A1 | 7/2010 | Johnson et al. |
| 2010/0192001 A1 | 7/2010 | Cornwall et al. |
| 2011/0022734 A1* | 1/2011 | Etheridge ............ H04J 3/0682 709/248 |
| 2011/0182371 A1 | 7/2011 | Suzuki et al. |

FOREIGN PATENT DOCUMENTS

| | | |
|---|---|---|
| FR | 2746533 A1 | 9/1997 |
| WO | 03/052999 A1 | 6/2003 |

OTHER PUBLICATIONS

Patent Cooperation Treaty, "Written Opinion," issued in connection with Application No. PCT/US2014/068793, Mar. 18, 2015, 7 pages.

* cited by examiner

SYNCHRONIZATION METHODS AND APPARATUS

FIELD OF THE DISCLOSURE

This disclosure relates generally to communication systems, and, more particularly, to synchronization methods and apparatus.

BACKGROUND

Communication networks include a plurality of devices that interact with each other via, for example, exchanges of messages. Such interactions often require synchronization between the clocks of the respective devices.

DETAILED DESCRIPTION

Figure 1:
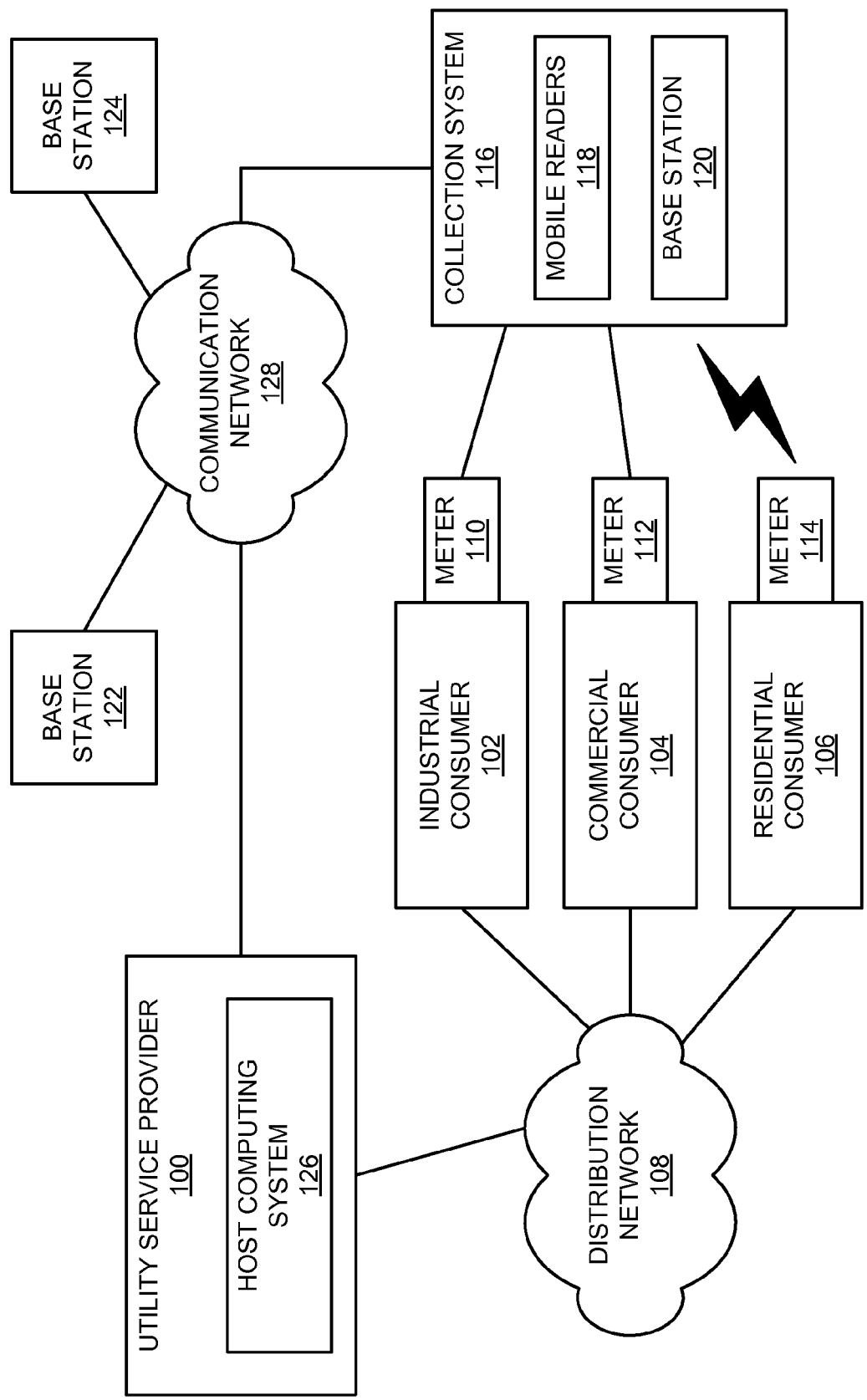
FIG. 1 is a schematic illustration of an environment in which example methods, apparatus, and articles of manufacture disclosed herein may be implemented.

A communication network having a plurality of interacting devices benefits from respective clocks of the interacting devices being synchronized (e.g., having a common value at a same time). For example, certain functionality implemented via the communication network, such as data collection, involves providing instructions or commands (e.g., request messages) to one or more devices to perform one or more actions or operations at a particular time. If different ones of the devices are operating according to unsynchronized clocks (e.g., clocks having different values at a same time), the function may be carried out with delay, may cause an error, and/or may experience other deficiencies.

Known synchronization techniques include sending large amounts of timing messages across an entire network to instruct devices on the network to set their clocks to a particular time value specified in the timing messages. Alternative known techniques involve each of the devices repeatedly polling a global absolute time source, such as the global positioning system (GPS), to determine a current global absolute time and then the device adjusting their times based on the global absolute time. Such techniques consume significant network resources and processing capabilities of the devices that may be better utilized to, for example, exchange substantive data (e.g., a type of data to which the devices are dedicated to collecting).

Examples methods, apparatus, and articles of manufacture disclosed herein reduce consumption of computing and transmission resources incurred in connection with synchronization of devices. By reducing the amount of consumed resources, examples disclosed herein ease the additional burden placed on the communication network by synchronization operations and free the saved resources for core functions. Moreover, example methods, apparatus, and articles of manufacture disclosed herein increase accuracy of clock synchronization. In turn, functionality of the communication network that is based on synchronization between the devices experiences improvement in terms of, for example, increased accuracy, reduced or eliminated errors, reduced or eliminated delays.

As described in detail below in connection with the figures, examples disclosed herein establish a schedule of maintenance windows for use in synchronizing clocks of endpoint devices (e.g., utility usage meters) that are in communication with collection devices (e.g., base stations that each collect usage information from a subset of the usage meters) and/or a central management device (e.g., a host computing system of a utility service provider). Examples disclosed herein utilize the schedule of the maintenance windows to determine whether any of the clocks of the endpoint devices has drifted (e.g., have moved away from an accurate time value). The clocks of the endpoint devices may drift due to, for example, processing capabilities of the endpoint devices, power or battery issues, temperature issues, precision limitations of the clocks, etc. The example schedule of maintenance windows disclosed herein is provided to and stored by the endpoint devices and the collection devices. In examples disclosed herein, the collection devices adhere to the maintenance window schedule according to a global absolute time source (e.g., Global Positions System (GPS), Global Navigation Satellite System (GLONASS), IP IEEE1588, etc.), thereby ensuring precise and accurate compliance with the maintenance window schedule by the collection devices. In examples disclosed herein, when a maintenance window of the schedule opens, the collection devices transmit a sequential series of data frames to those of the endpoint devices from which the respective collection device receives data. In disclosed examples, common portions (e.g., starts) of each of the data frames of the sequential series are spaced apart from neighboring data frame(s) by a known amount of time (e.g., one millisecond) within a maintenance window. As examples disclosed herein provide the maintenance window schedule to the endpoint devices, the endpoint devices know the global absolute time at which the maintenance window is scheduled to open. Thus, the endpoint devices of examples disclosed herein know the global absolute time at which a first one of the data frames is transmitted by the corresponding collection device.

In examples disclosed herein, the endpoint devices listen for the data frames of the maintenance windows according to respective native clocks of the endpoint devices. That is, according to examples disclosed herein, the endpoint device uses a native clock to trigger a listening session to receive the data frames (transmitted by the collection device) at a time corresponding to the beginning of the scheduled maintenance window. If the native clocks of the endpoint devices synchronized (e.g., with the global absolute time source within a threshold), the endpoint device receives a first one of the sequential data frames transmitted by the collection device in response to the maintenance window opening. On the other hand, if the native clocks of the endpoint devices have drifted (e.g., away from the global absolute time source outside of a threshold), the endpoint device receives a subsequent (later than the first) one of the sequential data frames transmitted by the collection device. Because examples disclosed herein make the endpoint device aware of the global absolute time at which the maintenance window opened at the transmitting collection device, as well as the number or position of the received data frame in the sequential series of uniformly spaced-apart data frames, the endpoint devices know how far the corresponding native clock has drifted from the global absolute time. In other words, examples disclosed herein enable the endpoint device to calculate offsets of the respective native clocks from the global absolute time. In examples disclosed herein, the endpoint devices adjust the respective native clocks according to the calculated offset, thereby bringing the endpoint devices into synchronization with the global absolute time.

Notably, examples disclosed herein enable the endpoint device to calculate the offset from the global absolute time without the endpoint devices having to query a source of the global absolute time, such as a GPS device. Instead, the collection device, of which there are much fewer than the endpoint devices, reference the global absolute time source. Therefore, examples disclosed herein significantly reduce an amount of communications (e.g., queries and/or other types of message exchanges) with the global absolute time source. Moreover, by establishing and sharing the maintenance window schedules with the endpoint devices, examples disclosed herein enable synchronization of endpoint devices without having to repeatedly send a time reference to the individual endpoint devices. Moreover, the maintenance window schedules of examples disclosed herein can be defined at any desired resolution, thereby providing flexibility to operators or administrators with respect to how often synchronization operations are performed.

FIG. 1 is an example environment in which examples disclosed herein may be implemented. The example of FIG. 1 includes a utility service provider 100 that supplies a consumable resource (e.g., natural gas, electricity, water, etc.) to a plurality of consumers 102-106 via a distribution network 108. The example utility service provider 100 of FIG. 1 charges the consumers 102-106 based on usage of the supplied consumable resource. To determine the charges, the utility 100 collects usage information associated with individual ones of the consumers 102-106. To do so, the utility 100 provides meters 110-114 to the corresponding consumers 102-106. Depending on the type of resource supplied by the example utility 100 of FIG. 1, the meters 110-114 measure, for example, usage of gas, electricity, water, etc. Usage information monitored by the meters 110-114 is obtained by a collection system 116 associated with the utility service provider 100. The example collection system 116 of FIG. 1 includes a plurality of mobile readers 118 and a base station 120. The example mobile readers 118 of FIG. 1 include communication devices (e.g., transceivers) deployed on, for example, a vehicle that travels near locations of the consumers 102-106 to establish communication with the meters 110-114. The example base station 120 of FIG. 1 is a stationary communication devices, such as a cellular base station, that establishes communication with nearby meters 110-114. In the example of FIG. 1, the meters 110-114 are assigned to communicate with the base station 120 due to, for example, the base station 120 being in proximity to the meters 110-114 and/or an interoperability between the meters 110-114 and the base station 120. Other meters associated with other consumers may be assigned to other base station(s) 122, 124 utilized by the example utility service provider 100 to collect data. In some examples, the mobile readers 118 collect usage information from the meters 110-114 (e.g., via radio communication(s)) and the mobile readers 118 convey the data to the corresponding base station 120.

The example meters 110-114 of FIG. 1 are in communication with the base station 120 and/or the mobile readers 118 via any suitable wired and/or wireless technology and/or protocol. While the example collection system 116 of FIG. 1 includes base stations 120-124 and mobile readers 118, additional or alternative types of collection devices may be employed by the example utility service provider 100 of FIG. 1. The example mobile readers 118, the example base stations 120-124, and/or any other device in communication with the meters 110-114 to collect data may be referred to herein as collection devices.

Component(s) of the example collection system 116 of FIG. 1 communicate data (e.g., usage information collected from the meters 110-114) to a host computing system 126 of the example utility service provider 100 via, for example, a communication network 128 (e.g., a LAN, WAN, cellular network, the Internet, etc.). Additionally or alternatively, component(s) of the example collection system 116 communicate directly with the host computing system1 126. The example host computing system 126 of FIG. 1 performs a plurality of tasks including, for example, coordinating collection of usage information. In the illustrated example of FIG. 1, the collection of usage information includes exchanges of messages between the meters 110-114, collection devices (e.g., the base station 120 and/or the mobile readers 118) and/or the host computing system 126.

To facilitate accurate and efficient transmission and receipt of the messages and/or other communication(s), clocks of the meters 110-114 are desirably synchronized (e.g., have the same value or a sufficiently similar value (e.g., within a threshold amount of time)). Examples disclosed herein to synchronize the meters 110-114 are described in detail below. While the examples disclosed herein are described below in context with a utility service provider and meters that monitor usage of resource(s) provided by the utility service provider, examples disclosed herein may be utilized in additional or alternative context(s) and/or environment(s) to synchronize devices, such as any suitable endpoint devices of a network.

Figure 2:
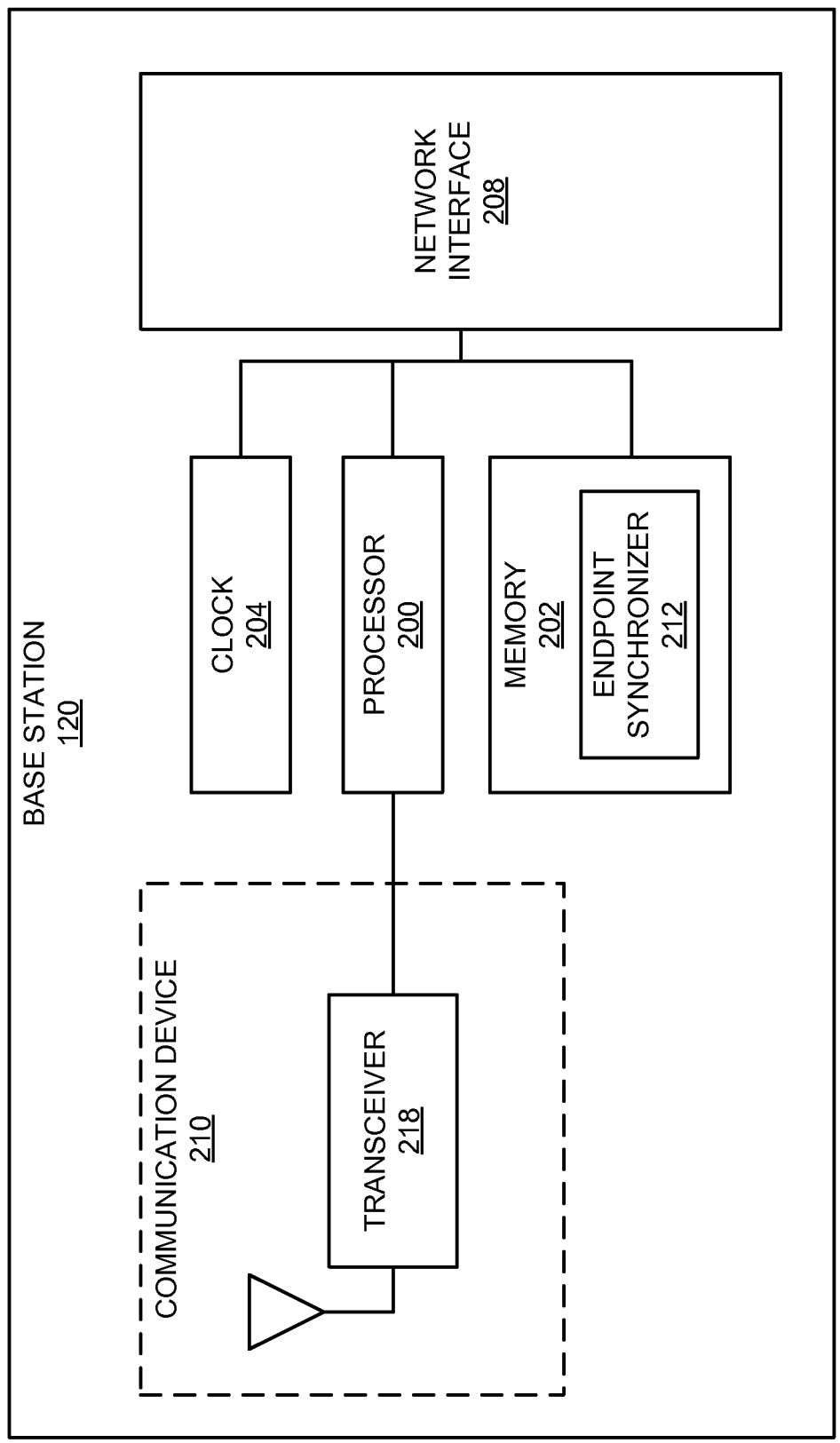
FIG. 2 is a block diagram representative of an example implementation of the base stations of FIG. 1.

FIG. 2 illustrates an example implementation of the base station 120 of FIG. 1. The example base station 120 of FIG. 2 includes a processor 200, a memory 202, and a clock 204. The example base station 120 of FIG. 1 includes a network interface 208 to implement one or more components for communicating with external devices (e.g., via the communication network 128), utilizing any suitable protocol, such as TCP/IP protocols, Ethernet, WiFi, Broadband Over Power Line, GPRS and/or other cellular-based protocols, and/or any combination thereof. The example base station 120 of FIG. 2 includes a radio-based communication device 210 for transmitting and receiving wireless communications (e.g., with other radio-based devices, such as the meters 110-114, the mobile readers 118, the host computing system 126, etc.). In the example of FIG. 2, the communication device 210 includes a transceiver 218 of half-duplex (transmit or receive but not both simultaneously) or full duplex design (transmit and receive simultaneously) to identify, locate and/or store, for example, usage information obtained from the meters 110-114. In the illustrated example, the usage information is conveyed (e.g., uploaded) to the host computing system 126 on a periodic basis (e.g., hourly).

The processor 200 of the example base station 120 processes incoming messages from the meters 110-114 and facilitates storage of the corresponding usage information in the memory 202. In some examples, the processor 200 parses and/or packages the usage information messages into a structured format suitable for transmission over the communication network 128. In the illustrated example, an example endpoint synchronizer 212 constructed in accordance with teachings of this disclosure is stored in the memory 202. As described in detail below, the example processor 200 executes instructions associated with the example endpoint synchronizer 212 to facilitate synchronization of, for example, the meters 110-114 of FIG. 1.

Figure 3:
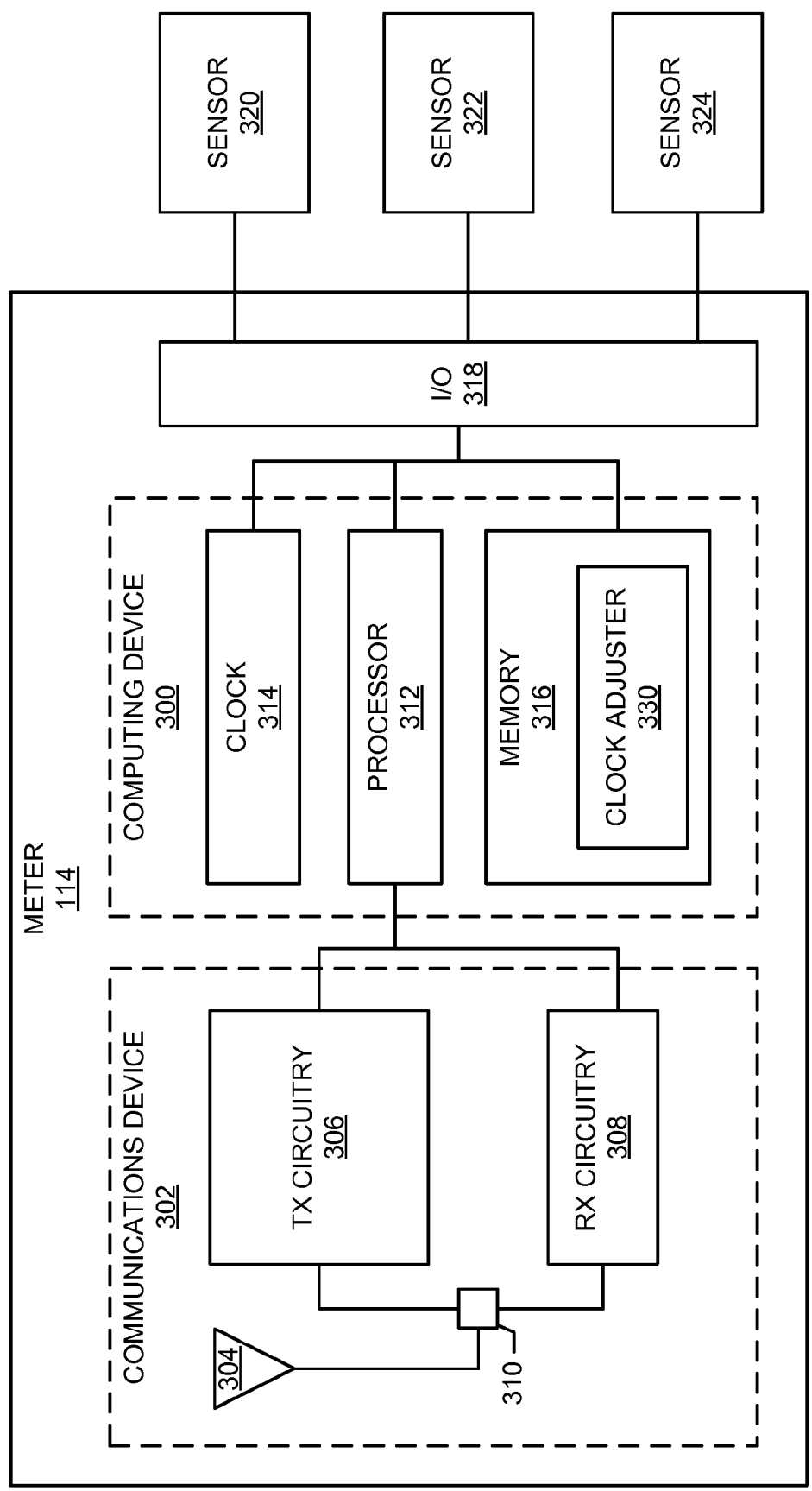
FIG. 3 is a block diagram of an example implementation of one of the example meters of FIG. 1.

FIG. 3 illustrates and example implementation of one of the example meters 110-114, such as the meter 114 deployed in connection with the residential consumer 106. The example meter 114 of FIG. 3 gathers and stores data from a plurality of sensors capable of monitoring parameter(s) associated with, for example, usage of the resource provided by the example utility service provider 100 of FIG. 1. The example meter 114 obtains, stores, formats and/or encodes the sensor data according to one or more protocols and transmits the data to, for example, one of the mobile readers 118, the base station 120, and/or the host computing system 126 of FIG. 1. The example meter 114 of FIG. 3 is also capable of receiving data from, for example, the mobile readers 118, the base station 120, and/or host computing system 126 of FIG. 1.

The example meter 114 of FIG. 3 includes a computing device 300 communicatively coupled to a communications device 302. In the illustrated example, the communications device 302 is a radio-based transceiver including an antenna 304, transmit circuitry 306, receive circuitry 308, and an antenna multiplexer or duplexer 310 that switches between the transmit circuitry 306 and the receive circuitry 308 depending on a mode of operation of the communications device 302. The multiplexer 310 may be a duplexer, which allows simultaneous operation of the transmit circuitry 306 and the receive circuitry 308. The communications device 302 may be configured to transmit RF-based communication signals according to any suitable modulation protocol(s), such as DSSS, FHSS, FM, AM, etc. In some examples, the transmit circuitry 306 and/or the receive circuitry 308 are implemented as an RF integrated circuit (RFIC) chip and comprise a plurality of components including, for example, mixers, a voltage controlled oscillator (VCO), a frequency synthesizer, automatic gain control (AGC), passive and/or active filters, such as harmonic filters, dielectric filters, surface acoustic wave (SAW) filters, etc., analog to digital (A/D) converters, digital to analog (D/A) converters, modulators, demodulators, phase-locked loops (PLLs), upconverters, downconverters, and/or other analog or digital component(s) that process baseband signals, RF signals, or IF band signals, etc.

The example computing device 300 of the example meter 114 includes a processor 312, a clock 314 and a memory 316. The example meter 114 of FIG. 3 includes a network I/O interface 318 for interfacing with, for example, sensors 320-324 capable of monitoring usage of one or more resources by the consumer 106. The sensors 320-324 may be any suitable type of sensor(s) to, for example, obtain consumption or usage information, tampering data, etc. The data obtained via the sensors 320-324 is processed by the processor 312 and stored in the memory 316. In the illustrated example of FIG. 3, the processor 312 executes instructions associated with a clock adjuster 330. The example clock adjuster 330 is constructed in accordance with the teachings of the disclosure and is described in detail below.

Figure 4:
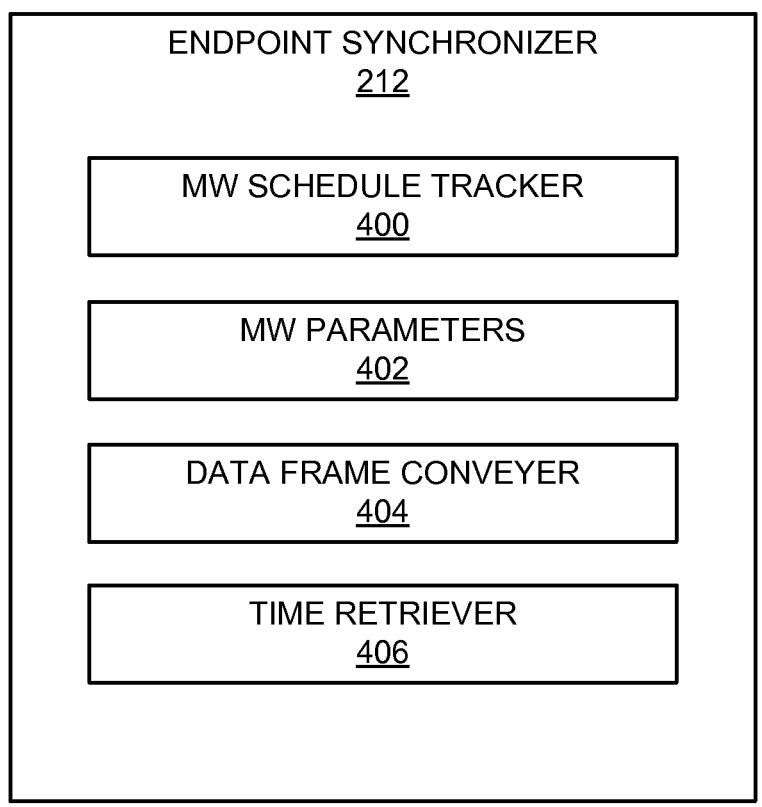
FIG. 4 is a block diagram representative of an example implementation of the example endpoint synchronizer of FIG. 2.

FIG. 4 illustrates an example implementation of the example endpoint synchronizer 212 of FIG. 2. The example endpoint synchronizer 212 is utilized by the example base station 120 of FIGS. 1 and/or 2 to synchronize the clocks of the meters 110-114. In the illustrated example, the endpoint synchronizer 212, in coordination with the clock adjuster 330, synchronizes the clocks 314 of the meters 110-114 by ensuring that the clocks 314 each have a value within a threshold amount of time of a global absolute time, such as the current time of the GPS. While the example endpoint synchronizer 212 of FIG. 4 and the corresponding base station 120 synchronize the clocks 314 of each of the meters 110-114 assigned to the base station 120, the following description is directed to the residential consumer 106 and the corresponding meter 114 of FIGS. 1 and/or 3.

The example endpoint synchronizer 212 of FIG. 4 cooperates with the example clock adjuster 330 of FIG. 3 to ensure that the clock 314 of the meter 114 does not drift from a time reference (e.g., a value of a global absolute time source) beyond, for example, a threshold amount of time. The example clock 314 of the meter 114 may drift due to a plurality of different reasons, such as power source fluctuation, precision of the clock 314, errors associated with the processor 312, etc. In the illustrated example, a schedule of maintenance windows is defined to accomplish the cooperation between the example endpoint synchronizer 212 of the example base station 120 and the example clock adjuster 330 of the example meter 114. The example endpoint synchronizer 212 includes a maintenance window schedule tracker 400 to store and/or update the maintenance window schedule. The example maintenance window tracker 400 of FIG. 4 is any suitable data structure to provide the endpoint synchronizer 212 with an accurate and updated version of the maintenance window schedule.

In some examples, the host computing system 126 of the utility service provider 100 defines the maintenance window schedule. In some examples, a first maintenance window schedule is defined for the example base station 120 and the corresponding meters 110-114 and a second, different maintenance window schedule is defined for another base station associated with the utility service provider 100, such as the other base stations 122 and/or 124 of FIG. 1. That is, the example host computing service 126 may define the maintenance window schedules differently from base station to base station. The example host computing system 126 and/or an operation or administrator thereof can define the maintenance window schedule depending on, for example, how often synchronization operations are to be executed. As described in detail below, one or more parameters of the maintenance window schedule can be set by the host computing system 126 or an operator or administrator thereof depending on the desired performance of the synchronization operations disclosed herein.

Figure 5:
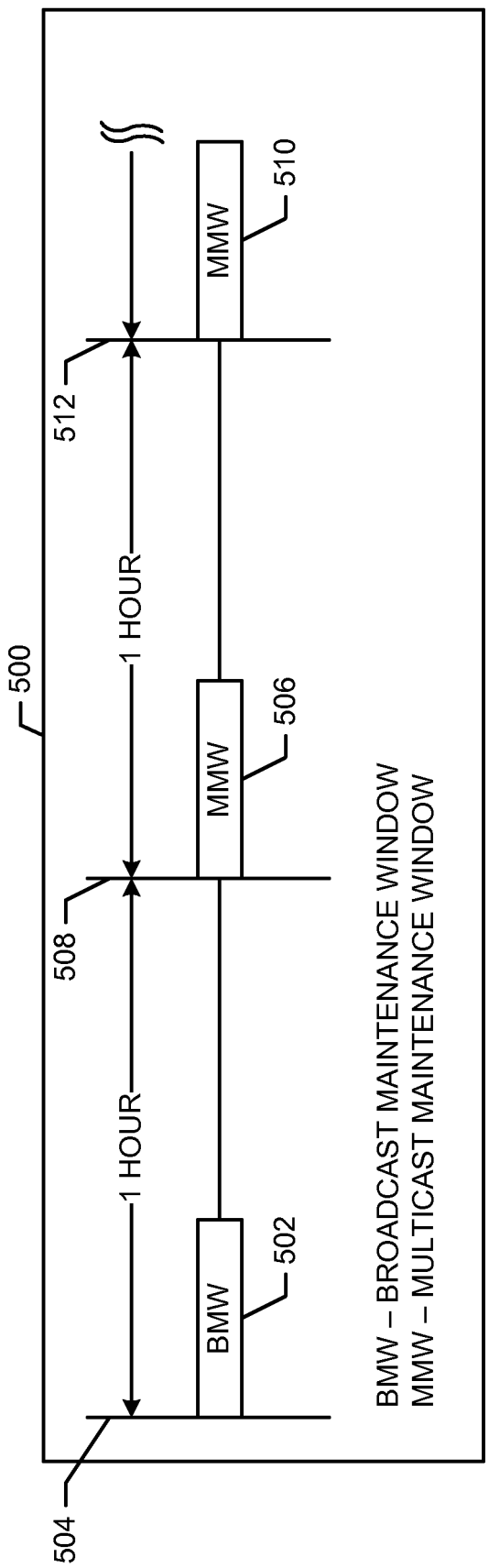
FIG. 5 is a diagram including example maintenance windows associated with the example endpoint synchronizer of FIGS. 2 and/or 3.

An example maintenance window schedule 500 is illustrated in FIG. 5. The example maintenance window schedule 500 of FIG. 5 includes a broadcast maintenance window 502 at the onset of a particular hour of day 504 (e.g., 02:00:00), a first multicast maintenance window 506 at the onset of a subsequent hour 508 (e.g., 03:00:00), and a second multicast maintenance window 510 at the onset of another subsequent hour 512 (e.g., 04:00:00). In the illustrated example, the broadcast maintenance window 502, which is conveyed to each endpoint device (e.g., meter) associated with the utility service provider 100, is scheduled for broadcast once per day (e.g., a time of during at which the typically experiences low traffic). In the illustrated example, a multicast maintenance window (e.g., the first and second multicast maintenance windows 506, 508), which is conveyed to a select number of endpoint devices (e.g., meters) is scheduled for multicast at each hour of the day except for the hour at which the broadcast maintenance window 502 is scheduled. In the illustrated example, the size of the maintenance windows 502, 506, 510 and the data transmissions within the maintenance windows 502, 506, 510 are less than or equal to (e.g., do not exceed) a duty cycle of the base station 120. In the illustrated example, the maintenance window size is selected to be a certain portion of the duty cycle to be used for anticipated unicast downlink traffic, thereby allowing unicast downlink traffic to be utilized for the given duty cycle period. Additional or alternative schedules may be implemented depending on, for example, desires and/or requirements of the utility service provider 100.

Figure 6:
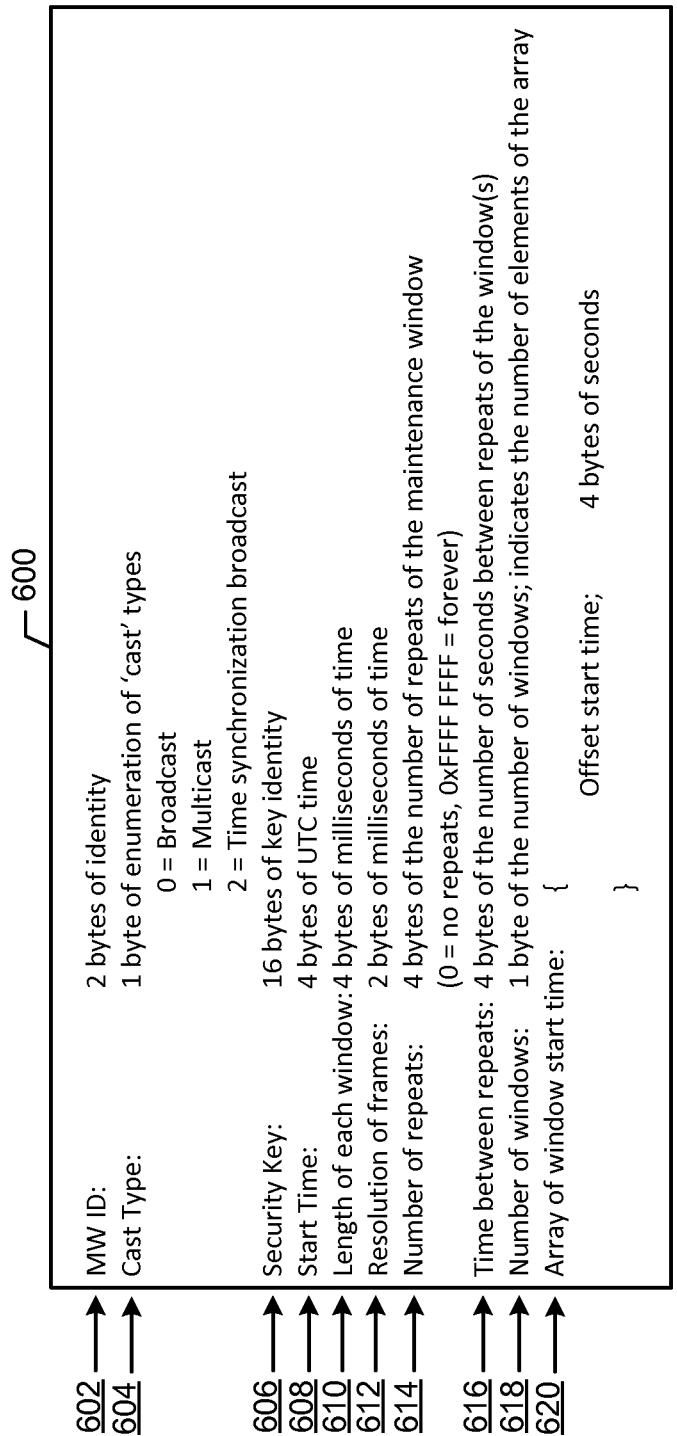
FIG. 6 is a listing of example parameters associated with the example endpoint synchronizer of FIGS. 2 and/or 3.

In the illustrated example, the host computing system 126 of the utility service provider 100 defines parameters 402 for the maintenance windows. The example endpoint synchronizer 212 of FIG. 4 stores the parameters 402 in any suitable data structure. The example endpoint synchronizer 212 of FIG. 2 uses the maintenance window parameters 402 to populate data frames of the maintenance windows, to adhere to the maintenance window schedule, to pass authentication and/or security checks, etc. FIG. 6 is an example set of parameters 600 stored as the example maintenance window parameters 402 in FIG. 4. The information provided by the example parameters 600 include a maintenance window type 602, a type of cast for the maintenance window 604, a security key 606, a start time 608, a window length 610, a frame resolution 612, a number of repeats 614, time between repeats 616, a number of windows 618, and an array of window start time 620. Additional or alternative information may be present in the maintenance window parameters 402 of FIG. 4.

The example endpoint synchronizer 212 of FIG. 4 includes a data frame conveyer 404 to send the data frames of the maintenance windows to the meters 110-114 in accordance with the maintenance window schedule tracked by the tracker 400 and in accordance with the parameters 402. In particular, the example data frame conveyer 404 of FIG. 4 populates a sequential series with information from the parameters 402. In particular, the data frame conveyer 404 generates and/or sends the data frames with each neighboring data frame (e.g., next or preceding in the sequence) spaced apart an equal amount of time (e.g., one millisecond). Therefore, start times, for example, of each data frame are spaced-apart equally throughout the maintenance window. Further, the example data frame conveyer 404 includes identifying information with the data frames such that the position of each data frame in the sequence can be identified by a receiving device. In other words, the example data conveyer 404 formats the data frames and/or populates the data frames with information that enables a device receiving the sequence of data frames to determine whether a received frame is the first, second, third, fourth, fifth, etc. data frame of the sequential series of data frames conveyed by the example endpoint synchronizer 212 of FIG. 4.

To ensure precise and accurate adherence to the schedule tracked by the maintenance window schedule tracker 400, the example data frame conveyer 404 of FIG. 4 bases conveyance of the data frames on a global absolute time source, such as GPS, GLONASS, IP IEE1588, etc. In the illustrated example, the data frame conveyer 404 complies with a rate of the corresponding global absolute time source, such as, for example, one pulse per second. The example endpoint synchronizer 212 of FIG. 4 includes a time retriever 406 that references (e.g., queries or polls) one or more sources of a global absolute time. When the example time retriever 406 determines that a time corresponding to a maintenance window of the schedule has occurred, the example time retriever 406 instructs or otherwise cause the data frame conveyer 404 to generate and send the data frames of the maintenance window to certain endpoint device(s) (e.g., the meters 110-114 associated with the base station 120) depending on, for example, whether the corresponding maintenance window is a broadcast or multicast window. In the illustrated example, the start of a maintenance window occurs within zero to +0.25 milliseconds of a global 1 pulse per second indication. Accordingly, the example endpoint synchronizer 212 of FIG. 4 conveys a sequential series of data frames to, for example, the meter 114 of FIG. 3, according to the maintenance window schedule and a global absolute time source.

Figure 7:
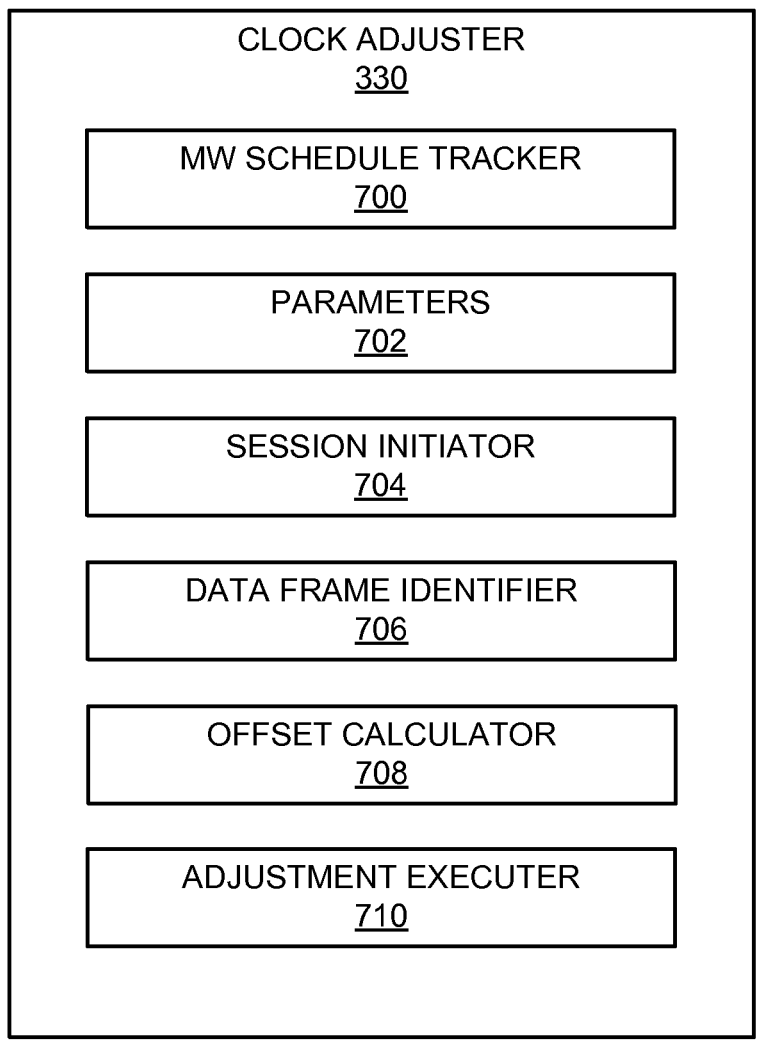
FIG. 7 is a block diagram of an example implementation of the example clock adjuster of FIG. 3.

FIG. 7 illustrates an example implementation of the clock adjuster 330 of FIG. 3. As described above, the example clock adjuster 330 and the example endpoint synchronizer 212 cooperate to prevent the clock 314 of the example meter 114 of FIGS. 1 and 3 from drifting (e.g., beyond a threshold amount of time) away from a common time source that forms a basis of synchronization for the system managed by the example utility service provider 100. In particular, the example clock adjuster 330 of FIG. 7 is provided with the maintenance window schedule according to which the example endpoint synchronizer 212 uses to convey data frames of maintenance windows to the example meter 114. The example clock adjuster 330 of FIG. 7 includes a maintenance window schedule tracker 700 to obtain and maintain (e.g., update) the maintenance window schedule. Accordingly, the example clock adjuster 330 is aware of the global absolute time at which the endpoint synchronizer 212 conveys the sequential series of data frames for clock adjustment. The example clock adjuster 330 of FIG. 7 executes listening sessions that are initiated according to the maintenance window schedule tracked by the example tracker 700. In some instances, the example listening sessions executed by the example clock adjuster 330 of FIG. 7 are referred to as maintenance windows.

Figure 8:
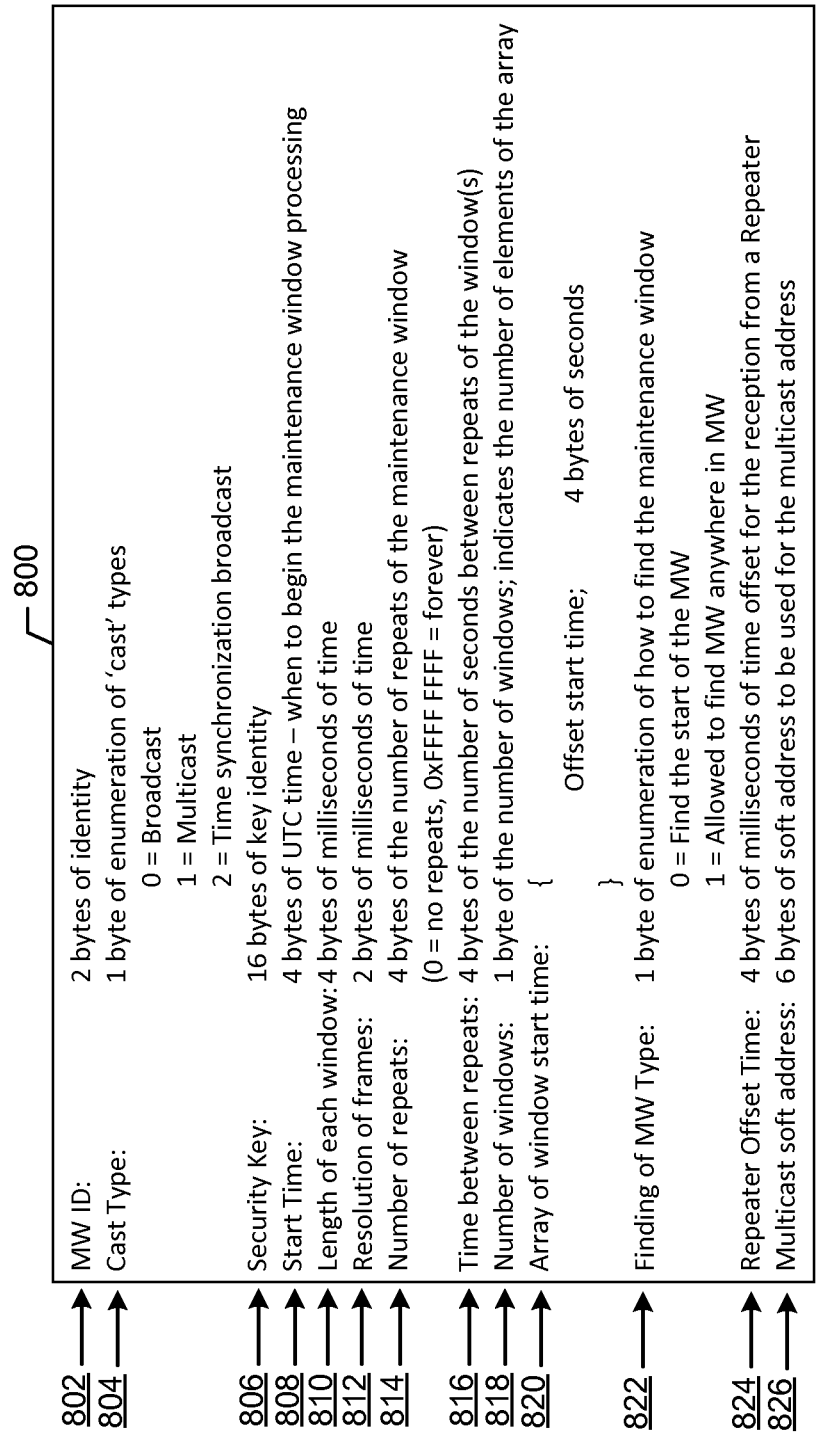
FIG. 8 is a listing of example parameters associated with the example clock adjuster of FIGS. 3 and/or 7

The example clock adjuster 330 of FIG. 7 includes parameters 702 that define the listening sessions. The example clock adjuster 330 of FIG. 7 stores the parameters 702 in any suitable data structure. In the illustrated example, the parameters 702 are provided by the example host computing system 126 of the example utility service provider 100. The example clock adjuster 330 of FIG. 7 uses the parameters 702 to schedule, initiate, and/or otherwise execute the listening sessions. FIG. 8 is an example set of parameters 800 stored as the example parameters 702 in FIG. 7. The information provided by the example parameters 800 include a maintenance window (or listening session) type 802, a type of cast 804, a security key 806, a start time 808, a window length 810, a frame resolution 812, a number of repeats 814, time between repeats 816, a number of windows 818, an array of window start time 820, an instruction of how to listen for the data frames 822, an offset associated with a repeater device 824, and a multicast soft address 826. Additional or alternative information may be present in the parameters 702 of FIG. 7.

Unlike the endpoint synchronizer 212 of FIG. 4, the example clock adjuster 330 initiates the listening sessions according to the native clock 314 of the meter 114. That is, when the native clock 314 of the meter 114 indicates that a start time of a maintenance window (e.g., the hour of day 508 corresponding to the first multicast maintenance window 506 of FIG. 5) has occurred, a session initiator 704 of the example clock adjuster 330 initiates a listening session such that the example clock adjuster 330 can receive the data frames of sent by the example base station 120. Put another way, while the example endpoint synchronizer 212 of the base station 120 initiates conveyance of the data frames according to a global absolute time source, the example clock adjuster 330 of the meter 114 initiates the corresponding listening session according to the native clock 314 of the meter 114. In the illustrated example, the native clock 314 of the meter 114 is considered synchronized (e.g., within a threshold amount of time of the global absolute time source) when the listening session includes receiving a first one of the sequential data frames transmitted by the base station 120. On the other hand, if the native clock 314 of the meter is unsynchronized (e.g., has drifted from the global absolute time source by more than a threshold amount of time or at all), the meter 114 will receive a subsequent (later than the first) one of the sequential data frames transmitted by the base station 120.

The example clock adjuster 330 of FIG. 7 includes a data frame identifier 706 to determine a position of the first-received data frame of the sequential series. As described above, the example endpoint synchronizer 212 formats and/or populates the data frames with information to enable identification of the position of each data frame in the maintenance window. The example data frame identifier 706 extracts and/or otherwise obtains the position of the first-received data frame in the sequential series via the information provided by the endpoint synchronizer 212 of the base station 120. For example, the data frame identifier 706 determines whether a data frame received immediately after the session initiator 704 initiates a listening session is a first, second, third, fourth, fifth, etc. data frame of the sequential series of the corresponding maintenance window.

Figure 9:
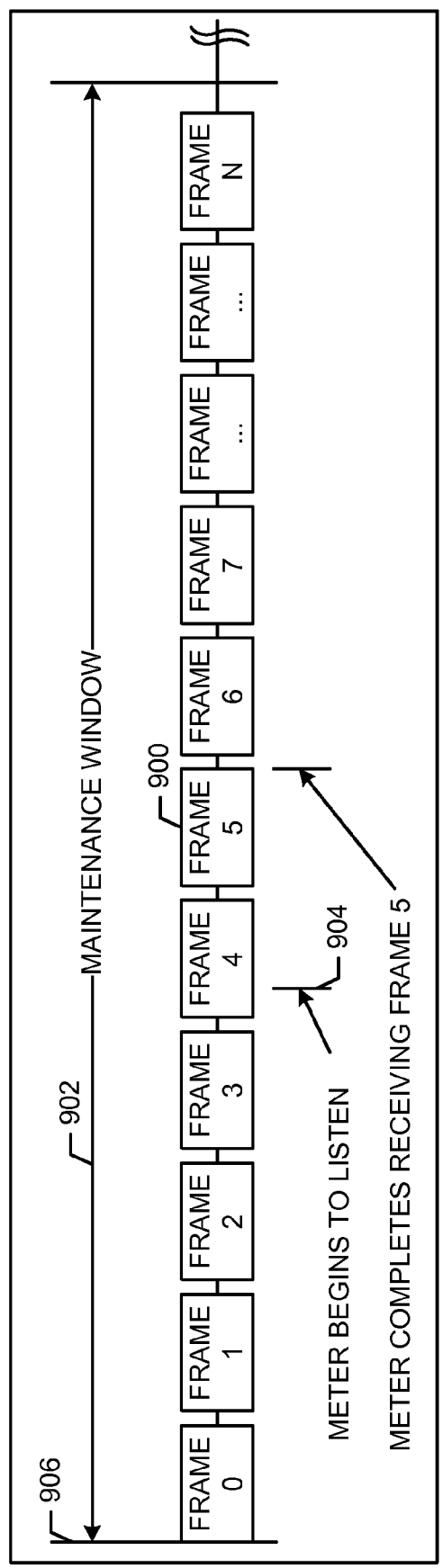
FIG. 9 is a diagram illustrative of data frames received by the example meters of FIGS. 1 and/or 3.

FIG. 9 illustrates and example scenario in which the example data frame identifier 706 of FIG. 7 determines that a data frame labeled 'FRAME 5' 900 of a maintenance window 902 conveyed by the base station 120 is received by the meter 114 after opening a listening session at a first time 904. In the example of FIG. 9, the native clock 314 of the meter 114 has drifted such that the listening session corresponding to the maintenance window 902 was initiated at the time 904, despite the maintenance window 902 being scheduled to open at a second, previous time 906.

As described above, in contrast to the listening session initiated by the meter 114 that is based on the native clock 314, the maintenance window 902 implemented by the base station 120 is initiated according to a global absolute time (e.g., the second time 906 of FIG. 6). The example clock adjuster 330 of FIG. 7 includes an offset calculator 708 to determine a difference between the global absolute time 906 and the first time 904 at which the meter 114 initiated the listening station. To do so, the example offset calculator 708 of FIG. 7 uses the position of the first-received data frame, as determined by the example data frame identifier 706, and the spacing information associated with the maintenance window 902. As described above, the data frames of the maintenance window 902 are spaced apart equally (e.g., by a uniform amount of time). For example, a starting point of a first frame (FRAME 0) is separated from (or spaced apart from) a starting point of a second frame (FRAME 1) by a particular amount of time. The spacing information is available to the example offset calculator 708 via, for example, the parameters 702 of FIG. 7 stored at the meter 114 and/or the maintenance window parameters 402 of FIG. 4. With the amount of time at which the data frames are spaced apart and the position within the sequence of the first-received data frame, the example offset calculator 708 of FIG. 7 calculates how far the native clock 314 of the meter 114 has drifted from the global absolute time. For example, the offset calculator 708 of FIG. 7 multiplies the amount of time between particular points (e.g., start times) of sequential data frames by the position of the first-received data frame to calculate a time difference between the start of the maintenance window executed by the base station 120 and the start of the listening session executed by the meter 114. That is, the example offset calculator 708 determines which one of the data frames was received first and to determines how far into the maintenance window that data frame is located. In the illustrated example, the calculation performed by the offset calculator 708 may be expressed as:

(time between data frames)*(position of first-received data frame in sequence)=offset.

In some examples, additional or alternative information is factored into the calculation performed by the example offset calculator 708 such as, for example, transmission delay, an offset from a beginning of the maintenance window, a start time of the maintenance window 902, the length of the data frames, the resolution of the data frames, etc.

The example clock adjuster 330 of FIG. 7 includes an adjustment executer 710 to adjust the native clock 314 of the meter 114 according to the amount of time calculated by the example offset calculator 708. In particular, the example adjustment executer 710 of FIG. 7 changes a value of the native clock 314 by an amount corresponding to the offset determined by the example offset calculator 708. That is, the example adjustment executer 710 of FIG. 7 adjusts the native clock 314 to be synchronized with the global absolute time used by the example endpoint synchronizer 212 to convey the data frames of the maintenance windows.

While an example manner of implementing the endpoint synchronizer 212 of FIG. 2 is illustrated in FIG. 4, one or more of the elements, processes and/or devices illustrated in FIG. 4 may be combined, divided, re-arranged, omitted, eliminated and/or implemented in any other way. Further, the example maintenance window schedule tracker 400, the example data frame conveyer 404, the example time retriever 406 and/or, more generally, the example endpoint synchronizer 212 of FIG. 2 may be implemented by hardware, software, firmware and/or any combination of hardware, software and/or firmware. Thus, for example, any of the example maintenance window schedule tracker 400, the example data frame conveyer 404, the example time retriever 406 and/or, more generally, the example endpoint synchronizer 212 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, maintenance window schedule tracker 400, the example data frame conveyer 404, the example time retriever 406 and/or, more generally, the example endpoint synchronizer 212 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example endpoint synchronizer 212 of FIG. 2 may include one or more elements, processes and/or devices in addition to, or instead of, those illustrated in FIG. 4, and/or may include more than one of any or all of the illustrated elements, processes and devices.

While an example manner of implementing the clock adjuster 330 of FIG. 3 is illustrated in FIG. 7, one or more of the elements, processes and/or devices illustrated in FIG. 7 may be combined, divided, re-arranged, omitted, eliminated and/or implemented in any other way. Further, the example maintenance window schedule tracker 700, the example session initiator 704, the example data frame identifier 706, the example offset calculator 708, the example adjustment executer 710 and/or, more generally, the example clock adjuster 330 of FIG. 3 may be implemented by hardware, software, firmware and/or any combination of hardware, software and/or firmware. Thus, for example, any of the example maintenance window schedule tracker 700, the example session initiator 704, the example data frame identifier 706, the example offset calculator 708, the example adjustment executer 710 and/or, more generally, the example clock adjuster 330 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, maintenance window schedule tracker 700, the example session initiator 704, the example data frame identifier 706, the example offset calculator 708, the example adjustment executer 710 and/or, more generally, the example clock adjuster 330 of FIG. 3 is/are hereby expressly defined to include a tangible computer readable storage device or storage disk such as a memory, a digital versatile disk (DVD), a compact disk (CD), a Blu-ray disk, etc. storing the software and/or firmware. Further still, the example clock adjuster 330 of FIG. 3 may include one or more elements, processes and/or devices in addition to, or instead of, those illustrated in FIG. 4, and/or may include more than one of any or all of the illustrated elements, processes and devices.

Figure 10:
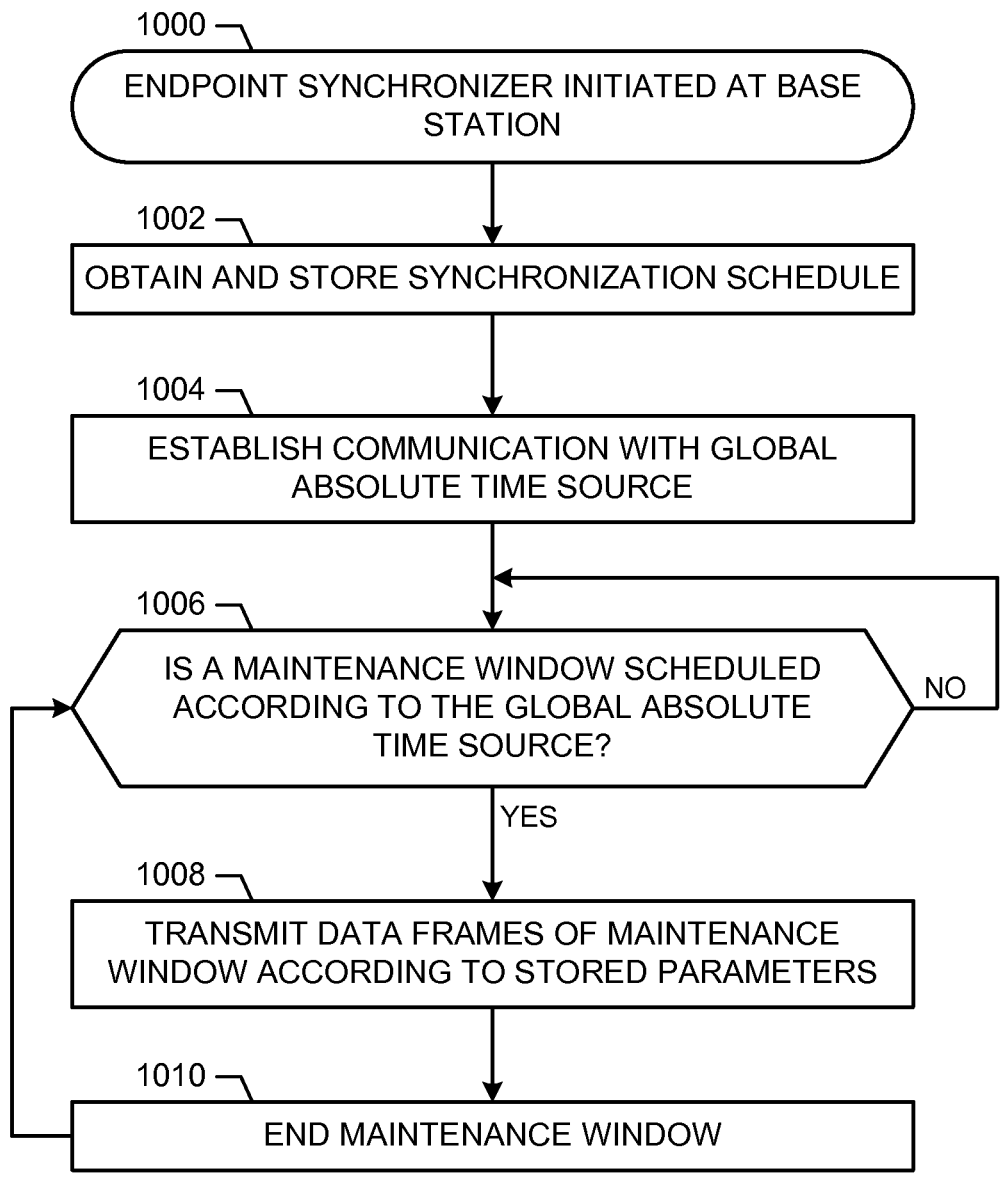
FIG. 10 is a flowchart illustrating example machine readable instructions that may be executed to implement the example endpoint synchronizer of FIGS. 2 and/or 3.
Figure 11:
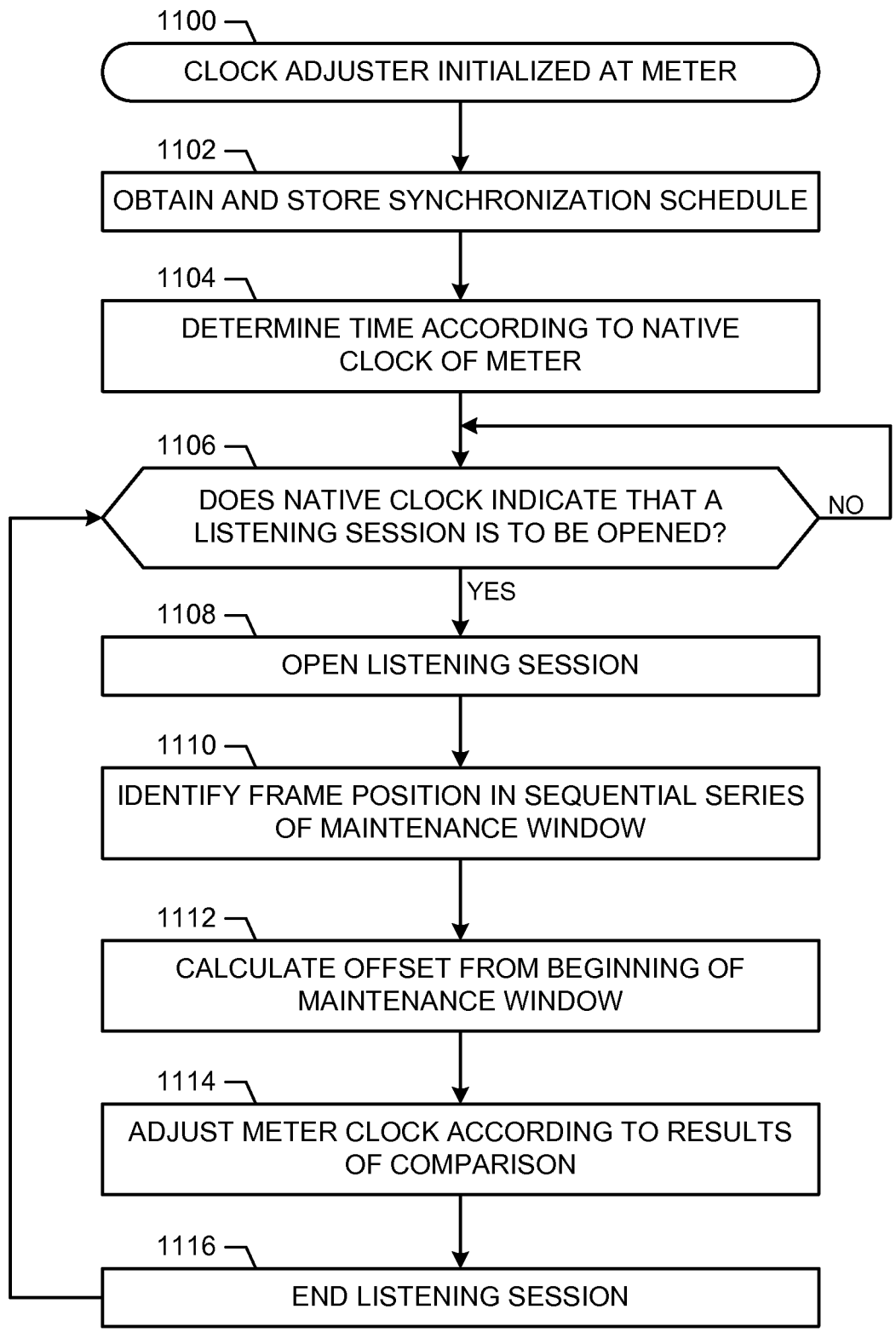
FIG. 11 is a flowchart illustrating example machine readable instructions that may be executed to implement the example clock adjuster of FIGS. 3 and/or 7.

A flowchart representative of an example process that may be implemented using, for example, machine readable instructions for implementing the example endpoint synchronizer 212 of FIGS. 2 and/or 4 is shown in FIG. 10. A flowchart representative of an example process that may be implemented using, for example, example machine readable instructions for implementing the example clock adjuster 330 of FIGS. 3 and/or 7 is shown in FIG. 11. In these examples, the machine readable instructions comprise programs for execution by a processor such as the processor 1312 shown in the example processor platform 1300 discussed below in connection with FIG. 13. The programs may be embodied in software stored on a tangible computer readable storage medium such as a CD-ROM, a floppy disk, a hard drive, a digital versatile disk (DVD), a Blu-ray disk, or a memory associated with the processor 1312, but the entire program and/or parts thereof could alternatively be executed by a device other than the processor 1312 and/or embodied in firmware or dedicated hardware. Further, although the example programs are described with reference to the flowcharts illustrated in FIGS. 10 and 11, many other methods of implementing the example endpoint synchronizer 212 and/or the example clock adjuster 330 may alternatively be used. For example, the order of execution of the blocks may be changed, and/or some of the blocks described may be changed, eliminated, or combined.

As mentioned above, the example processes of FIGS. 10 and 11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 10 and 11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example of FIG. 10 begins with the example endpoint synchronizer 212 being initiated at the example base station 120 (block 1000). Example initiation procedures are described below in connection with FIG. 12. In the illustrated example, the maintenance window schedule and the corresponding parameters are provided to the endpoint synchronizer 212 by, for example, the host computing system 126 of the utility service provider 100 (block 1002). The example maintenance window schedule tracker 400 stores the maintenance window schedule and the parameters are stored as the maintenance window parameters 402 at the example endpoint synchronizer 212 (block 1002). To determine whether a time corresponding to a maintenance window of the schedule has occurred, the example time retriever 406 establishes communication with a global absolute time source (e.g., GPS) and determines whether a maintenance window is scheduled to be open (block 1004). If a maintenance window is to be opened according to the global absolute time source (block 1006), the example data frame conveyer 404 populates and/or formats data frames of the maintenance window according to, for example, the maintenance window parameters 402 and conveys the data frames to, for example, the meters 100-114 (block 1008). Depending on the type of schedule maintenance window, the conveyance may be a broadcast or a multicast. In the illustrated example, the maintenance window is closed (block 1010) and control passes to block 1006. Accordingly, the example of FIG. 10 facilitates transmission of a sequential series of data frames within a maintenance window to, for example, the meter 114 associated with the residential consumer 106.

The example of FIG. 11 begins with the example clock adjuster 330 being initiated at the example meter 114 (block 1100). Example initiation procedures are described below in connection with FIG. 12. In the illustrated example, the maintenance window schedule and the parameters 702 are provided to the clock adjuster 330 by, for example, the host computing system 126 of the utility service provider 100 (block 1102). The example maintenance window schedule tracker 700 stores the maintenance window schedule (block 1102). The example session initiator 704 of the clock adjuster 330 references the native clock 314 of the meter 114 to determine whether a listening session (or meter maintenance window) should be initiated (block 1104). If a listening session is to be opened according to the native clock 314 (block 1106), the example session initiator 704 opens or initiates a listening session (block 1108). When a data frame is received at the meter 114 from the base station 120 (block 1110), the example data frame identifier 706 identifies the first-received data frame of the maintenance window (block 1110). That is, the example data frame identifier 706 identifies a position of the first-received data frame in the sequential series of data frames of the maintenance window implemented by the example base station 120. Based on, for example, the identified position of the received data frame and the amount of time between common points (e.g., start times) of the data frames of the maintenance window, the example offset calculator 708 determines an offset or amount of drift of the native clock 314 from the beginning of the maintenance window and, thus, the global absolute time (block 1112). The example adjustment executer 710 changes the value of the native clock 314 of the meter 114 according to the calculated offset and/or other calculation(s) and/or parameter(s) associated with the maintenance window (block 1114). In the illustrated example, the maintenance window is closed (block 1116) and control passes to block 1106.

Figure 12:
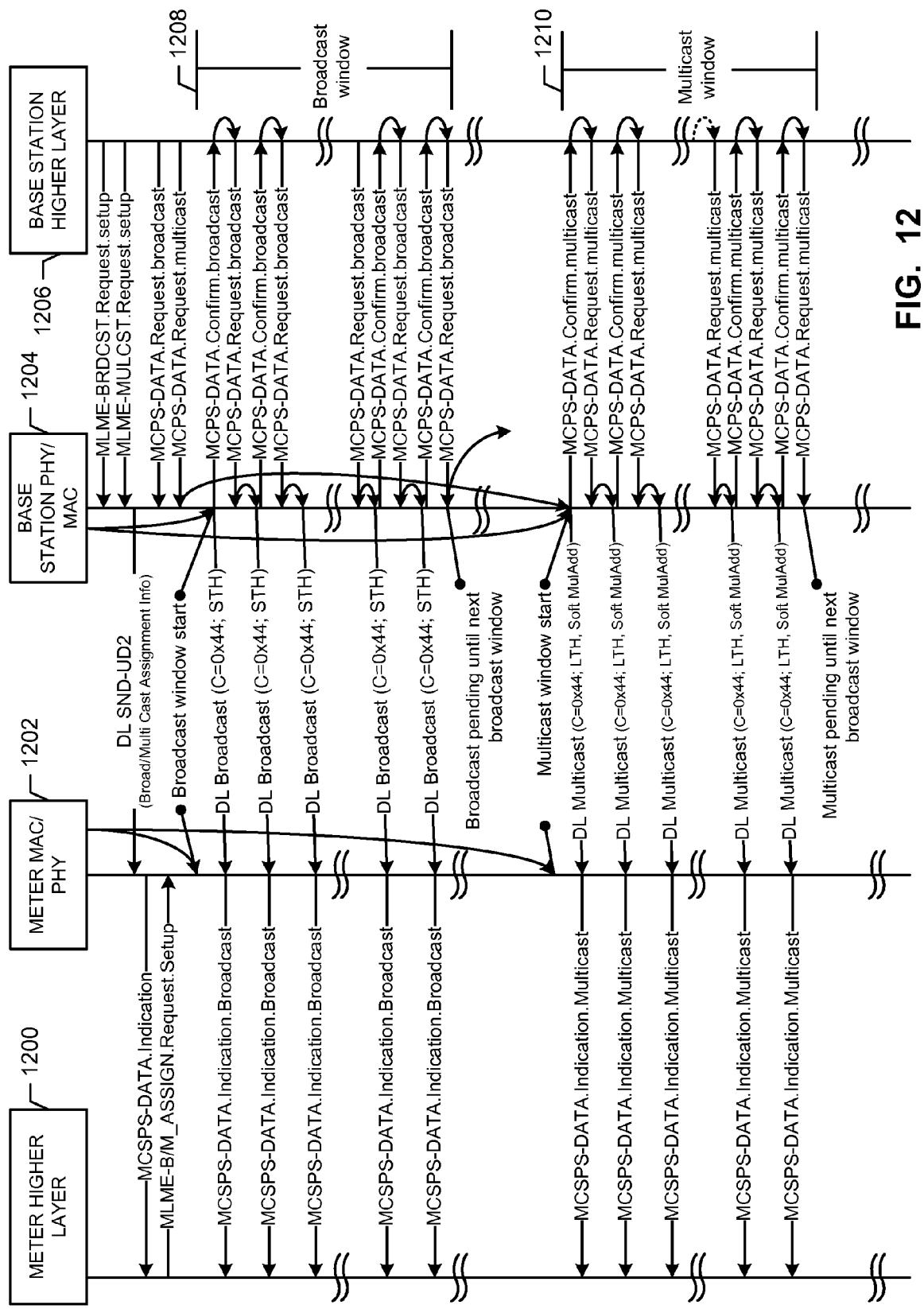
FIG. 12 is a sequence diagram representative of example communications between the example base station of FIGS. 1 and/or 2 and the example meter of FIGS. 1 and/or 3.

FIG. 12 is a sequence diagram representative of example communications between different logical layers of the example meter 114 of FIGS. 1 and/or 3, between different logical layers of the example base station 120 of FIGS. 1 and/or 2, and between the example meter 114 and the example base station 120. In the illustrated example, the logical layers of the example meter 114 include a physical layer 1202, which is referred to in FIG. 12 as 'MAC/PHY,' and a higher layer 1200, such as a data link layer (e.g., according to the OSI model). In the illustrated example, the logical layers of the base station 120 include a physical layer 1204, which is referred to in FIG. 12 as 'MAC/PHY,' and a higher layer 1206, such as a data link layer (e.g., according to the OSI model). The higher layer 1206 of the base station 120 setups the MAC/PHY 1204 for the maintenance windows disclosed herein. In the illustrated example, parameters (e g, timing parameters) for the broadcast/multicast maintenance windows are setup via a MLME-BRDCST.Request.setup and a MLME-MULCST.Request.setup call to the MLME (Medium access control (MAC) sub-layer management entity) of the base station 120. The higher layer 1206 of the base station 120 sends a MCPS-DATA.Request.Broadcast data to be transmitted for a broadcast data frame, when active. The higher layer 1206 of the base station 120 sends a MCPS-DATA.Request.Multicast data to be transmitted for a multicast data frame, when active.

When a time synchronization condition (e.g., a scheduled time for a broadcast window) occurs for the maintenance window type, the MAC/PHY 1204 of the base station 120 sets up and sends the associated broadcast or multicast downlink data frames. In the illustrated example, a MCPS (MAC Common Part Layer) of the MAC/PHY 12004 of the base station 120 sends a MCPS-DATA.Confirm.Broadcast status to the higher layer 1206 of the base station at the start of the downlink broadcast frame transmission. In the illustrated example, this confirmation status is used by the higher layer 1206 of the base station 120 to generate and feed the MAC/PHY 1204 of the base station 120 with the next desired MCPS-DATA.Request.Broadcast data. A similar mechanism (MCPS-DATA.Request.Multicast and MCPS-DATA.Confirm.Multicast) is used for the multicast data. As described above, the rate of one pulse per second associated with the global absolute time source (e.g., GPS) is utilized by the example base station 120. In the illustrated example, the start of a maintenance window occurs within zero to 0.25 milliseconds of a global one pulse per second indication.

In the illustrated example, the meter 114 is informed that that the meter 114 should be attempting to listen for a transmission (e.g., broadcast or multicast maintenance window data frames) from the base station 120. In some examples, the host computing system 126 of the utility service provider 100 tracks (e.g., via a status indicator) whether the m 114 (and other meters) has or has not been activated to listen to for transmissions from the base station 120 (or other base stations). If the meter 114 has not been activated to listen, a DL frame with a Broad/Multi Cast Assignment Network Management Configuration information is conveyed to the meter 114. In some examples, Broad/Multi Cast Assignment Network Management Configuration information indicates that the meter 114 is required to receive a start of each maintenance window to, for example, ensure that the meter 114 receives each transmission of the maintenance windows. Alternatively, the Broad/Multi Cast Assignment Network Management Configuration information may indicate that the meter 114 can begin receiving data anywhere in the maintenance window.

When the meter 114 receives the Broad/Multi Cast Assignment Network Management Configuration information at a network management application layer of the meter 114, the higher layer 1200 of the meter 114 uses the information to provide an MLME-B/M_ASSIGN.Request.Setup to the MAC/PHY 1202 of the meter 114 with the necessary information for the MAC/PHY 1202 to be used to receive broadcast and/or multicast data frames from the base station 120 at the appropriate time. When the meter 114 has been activated to listen for the maintenance window data frames and the base station 120 has been set up to convey the data frames to the meter 114, the example maintenance windows can be executed. The example of FIG. 12 includes example messages exchanged between the MAC/PHY layers 1202, 1204 of the meter 114 and the base station 120 that correspond to a broadcast maintenance window 1208 and example message messages exchanged between the MAC/PHY layers 1202, 1204 of the meter 114 and the base station 120 that correspond to a multicast maintenance window 1210.

Figure 13:
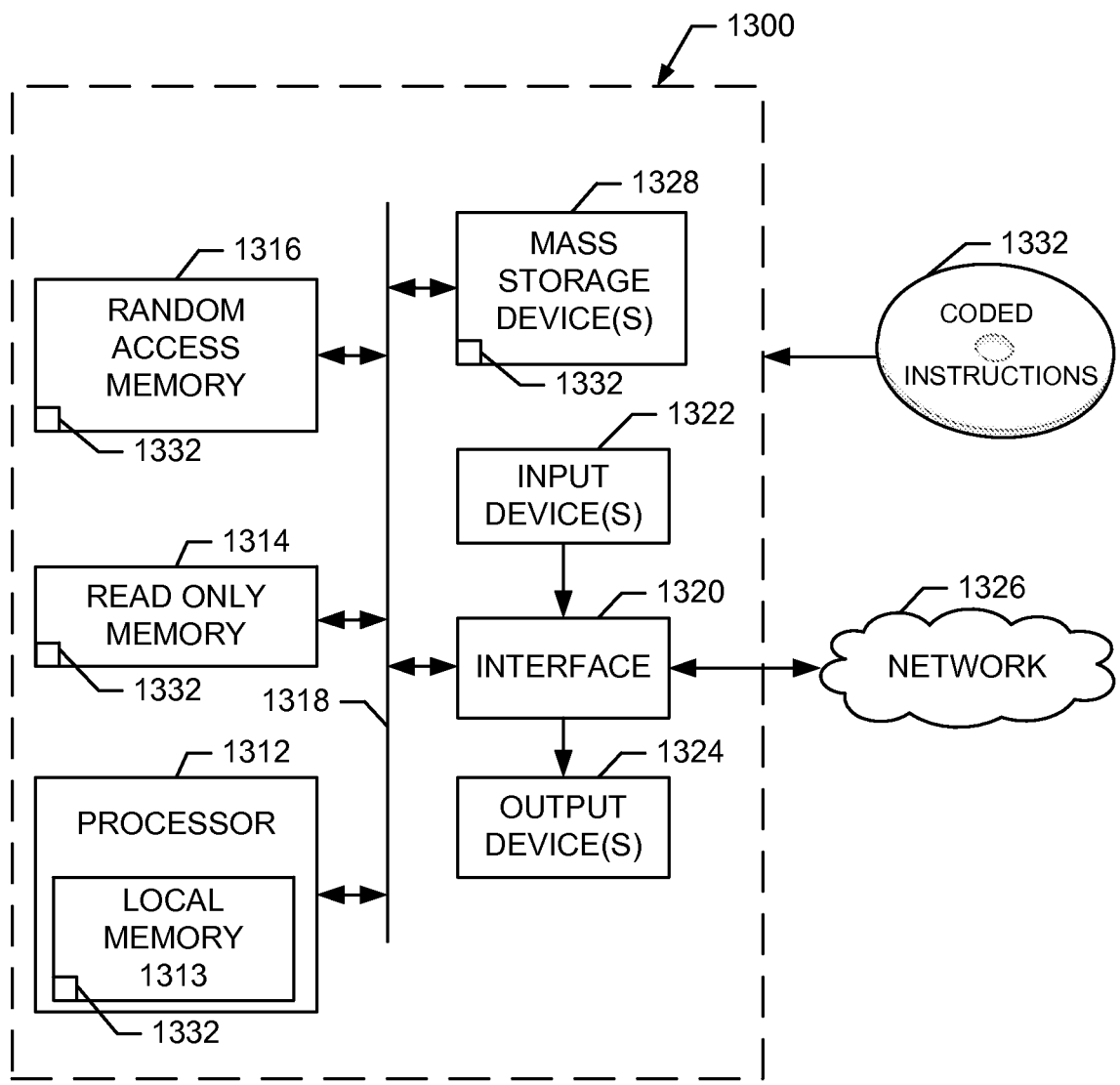
FIG. 13 is a block diagram of an example processing system capable of executing the example machine readable instructions of FIG. 10 to implement the example endpoint synchronizer of FIGS. 2 and/or 3 and/or the example machine readable instructions of FIG. 11 to implement the example clock adjuster of FIGS. 3 and/or 7.

FIG. 13 is a block diagram of an example processor platform 1300 capable of executing the instructions of FIG. 10 to implement the example endpoint synchronizer 212 of FIGS. 2 and/or 4 and/or the instructions of FIG. 11 to implement the example clock adjuster 330 of FIGS. 3 and/or 7. The processor platform 1300 can be, for example, a server, a personal computer, an Internet appliance, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a trackpad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives.

The coded instructions 1332 (e.g., the instructions of FIGS. 10 and/or 11 may be stored in the mass storage device 1328, in the volatile memory 1314, in the non-volatile memory 1316, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A data collection system, comprising:
   a meter to monitor usage of a resource provided by a utility service provider;
   a collection device to collect usage information from the meter and to provide the usage information to the utility service provider, wherein:
   the collection device is to convey data frames of a sequential series in a maintenance window in accordance with a schedule;
   the collection device is to adhere to the schedule according to a global absolute time source;
   the meter is to initiate a listening session in accordance with the schedule;
   the meter is to adhere to the schedule according to a native clock of the meter;
   the meter is to adjust the native clock to correspond to the global absolute time source by determining a position of one of the data frames received first during the listening session.

2. A data collection system as defined in claim 1, wherein the meter is to adjust the native clock by combining the determined position of the first-received data frame and an amount of time between respective ones of the data frames.

3. A data collection system as defined in claim 1, wherein the collection device is to include identifying information with each of the data frames to enable the meter to determine the position of each of the data frames within the sequential series.

4. A data collection system as defined in claim 1, wherein the meter is to store the schedule in local memory.

5. A data collection system as defined in claim 1, wherein the schedule is defined and provided to the meter via a host computing system associated with the utility service provider.

6. A meter, comprising:
   a usage monitor to calculate usage information associated with consumption of a resource supplied by a utility;
   memory to store a schedule of maintenance windows, the schedule indicating:
   a first time at which a collection device is scheduled to transmit a series of data frames to the meter according to a global absolute time source; and
   a second time at which the meter is to begin listening for the series of data frames according to a native clock of the meter; and
   a clock adjuster to:
   when a first one of the series of data frames is received during a listening session initiated at the second time:
   determine a position of the first data frame in the series;
   calculate a difference between the native clock of the meter and the global absolute time source based on the position of the first data frame in series; and
   adjust the native clock of the meter based on the difference.

7. A method, comprising:
   monitoring, via a meter, usage of a resource provided by a utility service provider;
   collecting, via a collection device, usage information from the meter and providing the usage information to the utility service provider;
   conveying, via the collection device, data frames of a sequential series in a maintenance window in accordance with a schedule;
   adhering the collection device to the schedule according to a global absolute time source;
   initiating, at the meter, a listening session in accordance with the schedule;
   adhering the meter to the schedule according to a native clock of the meter;
   adjusting, via the meter, the native clock to correspond to the global absolute time source by determining a position of one of the data frames received first during the listening session.

8. A method as defined in claim 7, further comprising adjusting, via the meter, the native clock by combining the determined position of the first-received data frame and an amount of time between respective ones of the data frames.

9. A method as defined in claim 7, further comprising including, via the collection device, identifying information with each of the data frames to enable the meter to determine the position of each of the data frames within the sequential series.

10. A method as defined in claim 7, further comprising storing the schedule in local memory of the meter.

11. A method as defined in claim 7, wherein the schedule is defined and provided to the meter via a host computing system associated with the utility service provider.

12. A method, comprising:
calculating usage information associated with consumption of a resource supplied by a utility;
storing a schedule of maintenance windows, the schedule indicating:
a first time at which a collection device is scheduled to transmit a series of data frames to a meter according to a global absolute time source; and
a second time at which the meter is to begin listening for the series of data frames according to a native clock of the meter; and
when a first one of the series of data frames is received during a listening session initiated at the second time:
determining a position of the first data frame in the series;
calculating a difference between the native clock of the meter and the global absolute time source based on the position of the first data frame in series; and
adjusting the native clock of the meter based on the difference.

13. A tangible computer readable storage medium comprising instructions that, when executed, cause a meter to at least:
calculate usage information associated with consumption of a resource supplied by a utility;
store a schedule of maintenance windows, the schedule indicating:
a first time at which a collection device is scheduled to transmit a series of data frames to the meter according to a global absolute time source; and
a second time at which the meter is to begin listening for the series of data frames according to a native clock of the meter; and
when a first one of the series of data frames is received during a listening session initiated at the second time:
determine a position of the first data frame in the series;
calculate a difference between the native clock of the meter and the global absolute time source based on the position of the first data frame in series; and
adjust the native clock of the meter based on the difference.

* * * * *